(12) United States Patent
Momiyama et al.

(10) Patent No.: US 12,245,544 B2
(45) Date of Patent: Mar. 11, 2025

(54) DRIVING APPARATUS, CONTROL METHOD OF DRIVING APPARATUS, AND NON-TRANSITORY COMPUTER READABLE MEDIA STORING PROGRAM

(71) Applicant: YAMABIKO CORPORATION, Tokyo (JP)

(72) Inventors: Hiroshi Momiyama, Ohme (JP); Hiroyuki Endo, Ohme (JP); Yoichi Miyahara, Ohme (JP); Akira Takekoshi, Ohme (JP)

(73) Assignee: YAMABIKO CORPORATION (JP)

( * ) Notice: Subject to any disclaimer, the term of this patent is extended or adjusted under 35 U.S.C. 154(b) by 628 days.

(21) Appl. No.: 17/564,375

(22) Filed: Dec. 29, 2021

(65) Prior Publication Data

US 2022/0232761 A1 Jul. 28, 2022

(30) Foreign Application Priority Data

Jan. 22, 2021 (JP) .................................. 2021-009113

(51) Int. Cl.
*A01D 34/00* (2006.01)
*A01D 34/68* (2006.01)
*A01D 34/90* (2006.01)

(52) U.S. Cl.
CPC ....... *A01D 34/006* (2013.01); *A01D 34/6806* (2013.01); *A01D 34/90* (2013.01)

(58) Field of Classification Search
CPC .. A01D 34/006; A01D 34/6806; A01D 34/90; A01D 34/78; A01D 34/907; B25F 3/00; B25F 5/02
See application file for complete search history.

(56) References Cited

U.S. PATENT DOCUMENTS

2016/0021819 A1* 1/2016 Nakano ..................... B25F 5/02
30/276
2019/0275657 A1 9/2019 Lanquist
(Continued)

FOREIGN PATENT DOCUMENTS

DE 2020-15006182 U1 11/2015
EP 1922913 A1 5/2008
(Continued)

OTHER PUBLICATIONS

Japanese Office Action issued in foreign counterpart JP patent application 2021-009113; mailed Jun. 18, 2024 (8 pages).
(Continued)

*Primary Examiner* — Adam J Behrens
*Assistant Examiner* — Robert E Pezzuto
(74) *Attorney, Agent, or Firm* — Harness, Dickey & Pierce, P.L.C.

(57) ABSTRACT

A handheld driving apparatus is provided for mowing or cutting an object. The driving apparatus comprises: a container, an action unit and a controller. The container is configured to extend from a rear side where a user is located toward a front side where the object is located. An action unit is provided on the front side of the container and configured to drive in such a manner that a mechanical action for mowing or cutting the object can be applied to the object. A controller is configured to execute a program so as to: in a driving step, drive the action unit by controlling a drive output of the action unit to a target value, in a monitoring step, monitor a state or a behavior of the drive output with respect to the target value during the control in the driving step, and in an adjusting step, adjust the target value based on the state or the behavior during the monitoring.

16 Claims, 7 Drawing Sheets

(56) References Cited

U.S. PATENT DOCUMENTS

2020/0260643 A1* 8/2020 Hata .................. A01D 34/4168
2020/0346335 A1* 11/2020 Yang ........................ B25F 3/00

FOREIGN PATENT DOCUMENTS

| JP | 2016-135108 A | 7/2016 |
| JP | 3208014 U | 12/2016 |
| JP | 2017-100224 A | 6/2017 |

OTHER PUBLICATIONS

European Search Report issued for the corresponding European Patent Application No. 21215369.6; dated Jun. 7, 2022 (total 13 pages).

* cited by examiner

DRIVING APPARATUS, CONTROL METHOD OF DRIVING APPARATUS, AND NON-TRANSITORY COMPUTER READABLE MEDIA STORING PROGRAM

CROSS REFERENCE TO RELATED APPLICATIONS

The present application claims priority under 35 U.S.C. § 119 to Japanese Patent Application No. 2021-009113, filed Jan. 22, 2021. The contents of this application are incorporated herein by reference in their entirety.

BACKGROUND

Technical Field

The present invention relates to a driving apparatus, a control method of the driving apparatus, and a non-transitory computer readable media storing a program.

Related Art

There is a handheld driving apparatus utilized for mowing or cutting grass, trees, or other objects. For instance, brush cutter and chain saw are well-known.

Japanese Utility Model Registration No. 3208014 discloses a prior art of a brush cutter as an example of a handheld driving apparatus.

SUMMARY OF THE INVENTION

However, in a known technology such as that represented by a brush cutter disclosed in Japanese Utility Model Registration No. 3208014, a burden on a user during use is not taken into consideration. In particular, such a driving apparatus generates noise and vibration during driving of an action unit, which places a heavy burden on the user. Further, there is also a demand for suppressing energy consumption because a high drive output is required to apply a high dynamic action to an object.

The present invention has been made in view of the above circumstances and provided a driving apparatus or the like which can reduce a burden on a user and has high energy efficiency.

According to one aspect of the present invention, there is provided a handheld driving apparatus for mowing or cutting an object. The driving apparatus comprises: a container, an action unit and a controller. The container is configured to extend from a rear side where a user is located toward a front side where the object is located. An action unit is provided on the front side of the container and configured to drive in such a manner that a mechanical action for mowing or cutting the object can be applied to the object. A controller is configured to execute a program so as to: in a driving step, drive the action unit by controlling a drive output of the action unit to a target value, in a monitoring step, monitor a state or a behavior of the drive output with respect to the target value during the control in the driving step, and in an adjusting step, adjust the target value based on the state or the behavior during the monitoring.

According to such an aspect of the present invention, when using the driving apparatus, the burden on the user can be reduced and the energy efficiency of the driving apparatus can be improved.

DETAILED DESCRIPTION OF EMBODIMENTS

Hereinafter, embodiments of the present invention will be described with reference to the drawings. Various features described in the embodiment below can be combined with each other.

A program for realizing a software in the present embodiment may be provided as a non-transitory computer readable medium that can be read by a computer, or may be provided for download from an external server, or may be provided so that the program can be activated on an external computer to realize functions thereof on a client terminal (so-called cloud computing).

In the present embodiment, the "unit" may include, for instance, a combination of hardware resources implemented by circuits in a broad sense and information processing of software that can be concretely realized by these hardware resources. Further, although various information is performed in the present embodiment, this information can be represented, for example, by physical signal values representing voltage and current, by high and low signal values as a bit set of binary numbers composed of 0 or 1, or by quantum superposition (so-called quantum bit). In this way, communication/calculation can be performed on a circuit in a broad sense.

Further, the circuit in a broad sense is a circuit realized by combining at least an appropriate number of a circuit, a circuitry, a processor, a memory, and the like. In other words, it is a circuit includes Application Specific Integrated Circuit (ASIC), Programmable Logic Device (e.g., Simple Programmable Logic Device (SPLD), Complex Programmable Logic Device (CPLD), and Field Programmable Gate Array (FPGA)), and the like.

1. Hardware Configuration

In the present embodiment, a hardware configuration of a driving apparatus according to the present embodiment will be described. The driving apparatus is a handheld driving apparatus for mowing or cutting an object. Preferably, the driving apparatus is a brush cutter 1 or a chain saw (not shown). Hereinafter, the brush cutter 1 will be described as an example.

Figure 1:
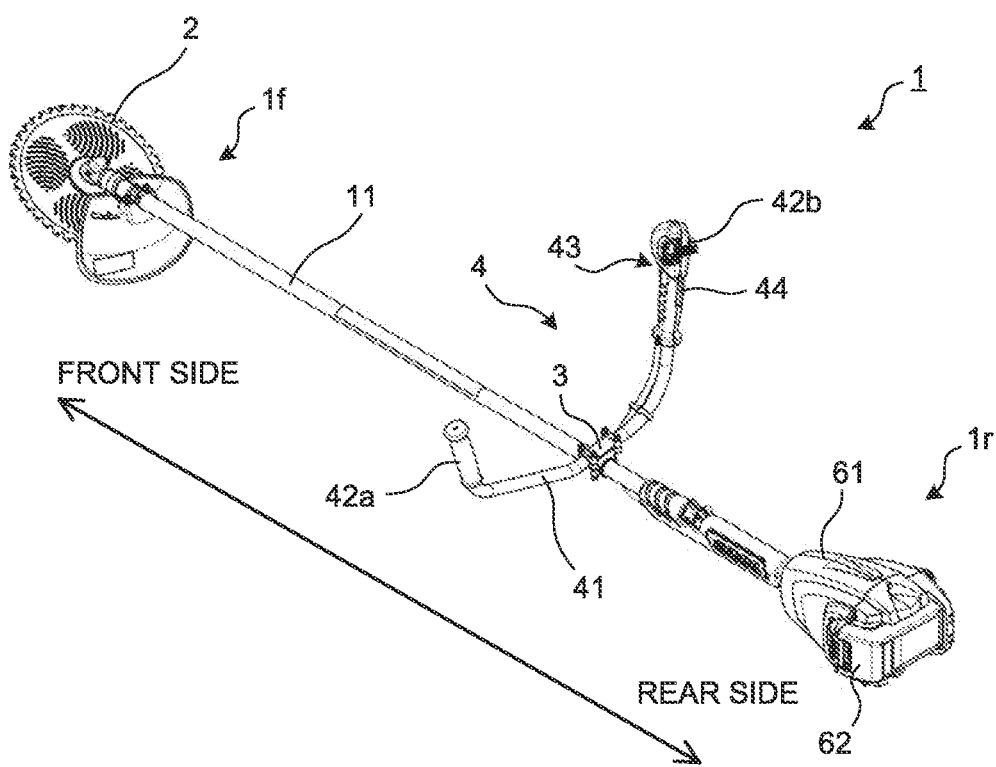
FIG. 1 is a perspective view showing an external configuration of a brush cutter 1.
Figure 2:
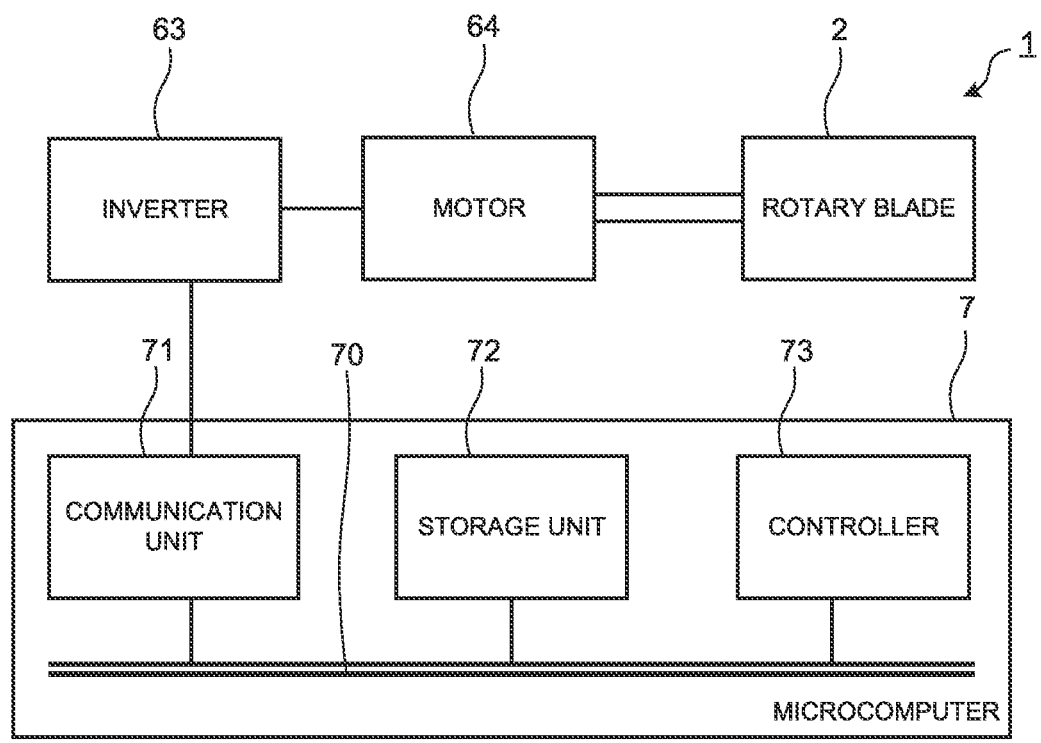
FIG. 2 is a block diagram showing an electrical hardware configuration of the brush cutter 1.

FIG. 1 is a perspective view showing an external configuration of the brush cutter 1. FIG. 2 is a block diagram showing an electrical hardware configuration of the brush cutter 1. As shown in FIG. 1, the brush cutter 1 includes an operation rod 11 as an example of a container, a rotary blade 2 as an example of an action unit, an attachment mechanism 3, a handle unit 4, and an electric unit 6. As shown in FIG. 2, the brush cutter 1 includes a microcomputer 7 having a controller 73.

(Operation Rod 11)

The operation rod 11 in the brush cutter 1 is an example of the container in the driving apparatus. The operation rod 11 extends from a rear side 1r where a user is located toward a front side 1f where an object is located. Although length of the operation rod 11 is not particularly limited, it is preferable that the length of the operation rod 11 is an appropriate length corresponding to height of an adult since the assumed user is an adult. In this way, by adopting the elongated pipe-shaped operation rod 11 as the container, the user can efficiently perform cutting or mowing of weeds or the like generated on the ground while walking in a natural posture without having to bend down. Further, a shaft or the like (not shown) is provided inside the operation rod 11, and the rotary blade 2 described later is connected to a motor 64 in the electric unit 6 in such a manner that power can be transmitted. Note that this is merely an example and is not limited thereto. For instance, the motor 64 may be provided near the rotary blade 2, i.e., in front of the operation rod 11. In such a case, a battery pack 62 (to be described later) that supplies power to the motor 64 may be provided in front of the operation rod 11 in the same way as the motor 64, or the battery pack 62 may be provided behind the operation rod 11, and power may be supplied to the motor 64 located in front of the operation rod 11 by a power supply cable for power supply inserted into the operation rod 11.

(Rotary Blade 2)

The rotary blade 2 in the brush cutter 1 is an example of an acting unit in the driving apparatus. The rotary blade 2 is provided at a front side 1f of the operation rod 11, particularly preferably at a front end of the operation rod 11. The rotary blade 2 is configured to drive in such a manner that a mechanical action for mowing or cutting the object can be applied to the object. The rotary blade 2, which is an example of such an action unit, may be configured to be replaceable as a unit due to wear and deterioration associated with use. Further, the rotary blade 2 is preferable to be configured to be replaceable as a unit in such a manner that an action unit other than the rotary blade 2 is attached according to purpose of work. In the present embodiment, the rotary blade 2 is configured to rotary drive. In other words, a target value PV and a drive output DO are number of rotations of the rotary blade 2 in the present embodiment. This is only a case of the rotary blade 2 and is not limited thereto. The target value PV and the drive output DO will be further described later.

The number of rotations of the rotary blade 2 is not particularly limited, but may be, for instance, 3000 to 10000 rpm. Specifically, the number of rotations is, for example, 3000, 3100, 3200, 3300, 3400, 3500, 3600, 3700, 3800, 3900, 4000, 4100, 4200, 4300, 4400, 4500, 4600, 4700, 4800, 5000, 5100, 5200, 5300, 5400, 5500, 5600, 5700, 21, 60, 6000, 6100, 6200, 6300, 6400, 6500, 520, 6700, 7 600, 7700, 7800, 7900, 8000, 8100, 8200, 8300, 8400, 8500, 8700, 8800, 8900, 9000, 9100, 9200, 9300, 9400, 9500, 9700, 9800, 9900, 10000 rpm, or may be in a range between any two of the numerical values illustrated above.

(Attachment Mechanism 3)

The attachment mechanism 3 has a hole through which the operation rod 11 is inserted and a hole through which the handle unit 4 is inserted, and allows the handle unit 4 to be crossed and attached to the linearly extending pipe-shaped operation rod 11. The shape of the attachment mechanism 3 is merely an example, and the attachment method of the operation rod 11 and the handle unit 4 is not particularly limited.

(Handle Unit 4)

The handle unit 4 is a part to be operated by a hand of the user, and is configured in a curved pipe-shape. The handle unit 4 includes an extending portion 41, a grip 42, a trigger lever 43, and a lockout lever 44.

As shown in FIG. 1, the extending portion 41 extends to left and right so as to intersect with the operation rod 11 extending back and forth around the attachment mechanism 3. A part of the extending portion 41 extending to left side is bent in the middle thereof, and a grip 42a directly grasped by the user is provided at an end thereof. On the other hand, a part of the extending portion 41 extending to right side is gently curved, and a grip 42b is provided at an end thereof. The grip 42b is configured to be larger than the grip 42a, and the trigger lever 43 and the lockout lever 44 are provided on the grip 42a.

The trigger lever 43 is a lever grasped and pressed by the user when the user rotates the rotary blade 2. By grasping the trigger lever 43, a motor 64 described later is energized and rotated, and the rotary blade 2 is rotary driven by the power. On the other hand, the lockout lever 44 is a safety mechanism, and is configured to, for example, electrically or preferably mechanically restrict pressing of the trigger lever 43. In other words, in a state in which the lockout lever 44 is not released, the user cannot press the trigger lever 43, and the rotary blade 2 cannot be rotary driven. According to this aspect, unintended rotary drive of the rotary blade 2 is prevented, and safety of the user is ensured.

Figure 3:
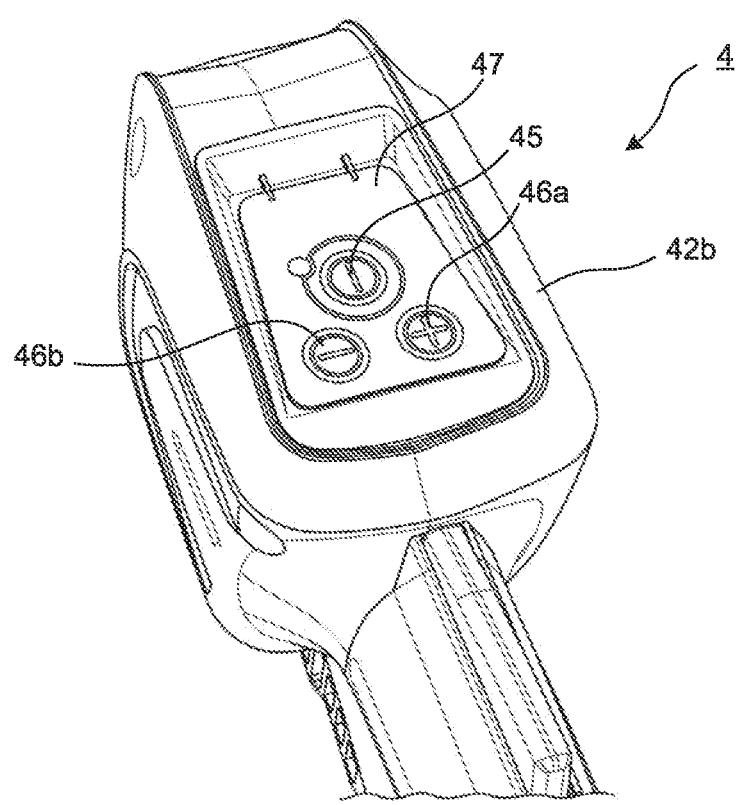
FIG. 3 is a perspective view showing an appearance of a grip 42b.

FIG. 3 is a perspective view showing an appearance of the grip 42b. The grip 42b includes an operation panel 47, and a power switch 45 and an output switching button 46 are provided on the operation panel 47. As shown in the drawing, the output switching button 46 preferably includes a plus button 46a and a minus button 46b. The power switch 45 is a switch for switching on and off of the main power supply, and the brush cutter 1 is in a standby state by turning on the power switch 45. In the standby state, the lockout lever 44 is released, and the rotary blade 2 is rotary driven when the trigger lever 43 is pressed.

In the present embodiment, the user can set or adjust the number of rotations of the rotary blade 2 by pressing down the output switching button 46. When the user presses down the plus button 46a, it is possible to allow the number of rotations of the rotary blade 2, more specifically, the target value PV for controlling the rotary blade 2, to upward. When the user presses down the minus button 46b, it is possible to allow the number of rotations of the rotary blade 2, more specifically, the target value PV for controlling the rotary blade 2, to downward. This will be further described later.

(Electric Unit 6)

The electric unit 6 is provided at the rear side 1r of the operation rod 11, particularly preferably at a rear end of the operation rod 11. As shown in FIGS. 1 and 2, the electric unit 6 includes a housing 61 and a battery pack 62, and an inverter 63, which is a precision part, a motor 64, and a microcomputer 7, which will be separately described, are provided inside the housing 61. The battery pack 62 includes a chargeable battery. As such a battery, for instance, a lead storage battery, and a NAS battery, a nickel hydrogen battery, a lithium-ion battery, or the like may be adopted as appropriate.

In the present embodiment, electrical energy stored in the battery pack 62 is converted into mechanical energy of the rotary drive of the rotary blade 2. More specifically, electric power of the battery pack 62 is applied to the motor 64 via the inverter 63 for adjusting a frequency, a voltage, or the like under the control of the microcomputer 7 to be described later. The power of the motor 64 is transmitted to the rotary blade 2 via a shaft or the like (not shown) in the operation rod 11, in such a manner that the rotary blade 2 rotary drives.

(Microcomputer 7)

The microcomputer 7 is configured to control the operation of the brush cutter 1. The microcomputer 7 includes a communication unit 71, a storage unit 72, and a controller 73, and these components are electrically connected via a communication bus 70 inside the brush cutter 1. Hereinafter, each component will be further illustrated.

The communication unit 71 is configured to transmit various electric signals from the microcomputer 7 to an external component. The communication unit 71 is configured to receive various electric signals from the external component to the microcomputer 7. More preferably, the communication unit 71 has a network communication function, thereby various information can be communicated between the brush cutter 1 and an external apparatus via a network such as the Internet.

The storage unit 72 stores various information defined by the description above. This may be implemented as, for example, a storage device such as a solid state drive (SSD) that stores various programs and the like related to the brush cutter 1 executed by the controller 73, or a memory such as a random access memory (RAM) that stores temporarily necessary information (argument, array, or the like) related to calculation of program. The storage unit 72 stores various programs or variables related to the brush cutter 1 executed by the controller 73.

The controller 73 is, for example, a central processing unit (CPU) (not shown). The controller 73 realizes various functions related to the brush cutter 1 by reading a predetermined program stored in the storage unit 72. In other words, the information processing executed by a software stored in the storage unit 72 is specifically implemented by the controller 73, which is an example of hardware, thereby the information processing can be executed as each functional unit included in the controller 73. These will be described in further detail in the next section. It is not limited to comprising a single controller 73, and may be implemented to have multiple controllers 73 for each function. A combination thereof may be used as well.

2. Functional Configuration

In the present embodiment, a functional configuration of the present embodiment will be illustrated. As described above, the information processing executed by the software stored in the storage unit 72 is specifically implemented by the controller 73, which is an example of hardware, thereby each functional unit included in the controller 73 can be executed.

Figure 4:
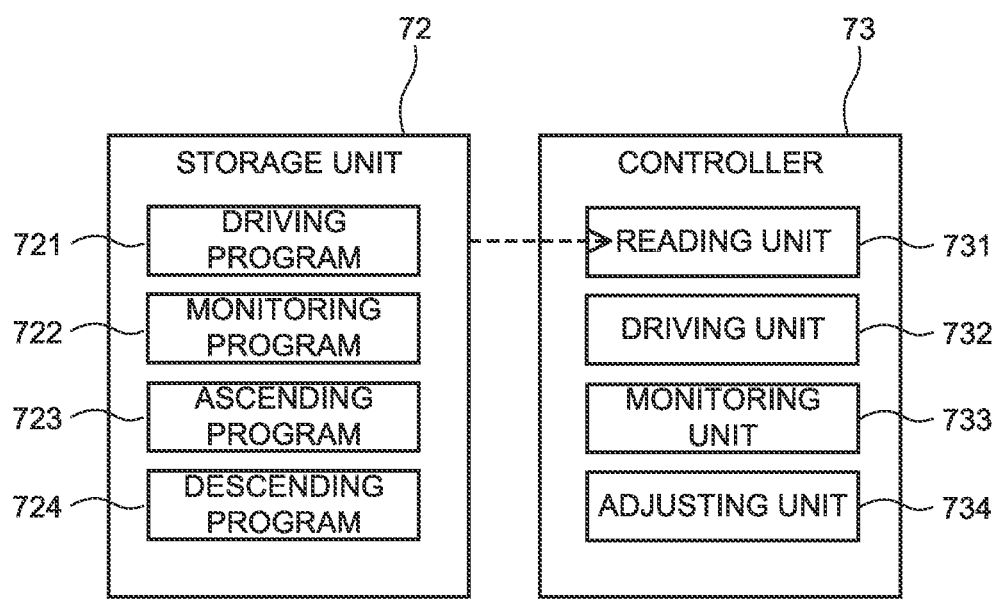
FIG. 4 is a block diagram showing a function realized by a controller 73 or the like in the brush cutter 1.

FIG. 4 is a block diagram showing a function realized by the controller 73 or the like in the brush cutter 1. Specifically, the controller 73 includes, as functional unit, a reading unit 731, a driving unit 732, a monitoring unit 733, and an adjusting unit 734. In addition, in relation to function of the brush cutter 1, the storage unit 72 stores a driving program 721, a monitoring program 722, an ascending program 723, and a descending program 724.

The reading unit 731 is configured to read various information received from outside via the communication unit 71 or stored in the storage unit 72 in advance. For instance, the reading unit 731 may read the driving program 721, the monitoring program 722, the ascending program 723, or the descending program 724 stored in the storage unit 72 in advance.

The driving unit 732 is configured to execute a driving step based on the driving program 721 which is read. Specifically, the driving unit 732 drives the rotary blade 2 by controlling the number of rotations of the rotary blade 2 (hereinafter, referred to as a drive output DO) to the target value PV. The control method in this case is not particularly limited, for example, P control, PD control, PID control, or the like may be adopted as appropriate. Each coefficient related to the control may be set to a preferable value as necessary. A specific example will be described later in detail.

The monitoring unit 733 is configured to execute a monitoring step based on the monitoring program 722 which is read. Specifically, the monitoring unit 733 monitors state or behavior of the drive output DO with respect to the target value PV during control in the driving unit 732. Specifically, for example, the brush cutter 1 may further include an encoder (not shown). The encoder is configured to output the drive output DO of the rotary blade 2 as a physical signal. The monitoring unit 733 detects each state or behavior of the drive output DO by monitoring a deviation between a signal output from the encoder, for example, a voltage value, and a physical amount corresponding to the target value PV, for example, a voltage value. In other words, the brush cutter 1 having an adjusting function described below can be realized with a general control configuration. A further specific example will be described later in detail.

The adjusting unit 734 is configured to execute an adjusting step based on the ascending program 723 or the descending program 724 which is read. Specifically, the adjusting unit 734 adjusts the target value PV based on the state or the behavior during monitoring. A specific example will be described later in detail.

3. Control Method

In this section, a control method of the brush cutter 1, which is an example of the driving apparatus described above, will be illustrated. The control method is a control method of a handheld brush cutter 1 for mowing or cutting an object. In particular, the control method includes each steps of the controller 73 in the brush cutter 1. More specifically, the control method includes following steps. A driving step is a step of driving the rotary blade 2 by controlling the drive output DO of the rotary blade 2 to the target value PV. A monitoring step is a step of monitoring a state or a behavior of the drive output DO with respect to the target value PV during the control in the driving step. An adjusting step is a step of adjusting the target value PV based on the state or the behavior during the monitoring.

By the way, the user can set the target value PV for controlling the number of rotations of the rotary blade 2 by using the output switching button 46. Preferably, the target value PV is configured to be set by the user by selecting one of a plurality of levels. Specifically, the number of stages of the level is, for example, 2, 3, 4, 5, 6, 7, 8, 9, 10, or may be within a range between any two of the numerical values exemplified here. Although determination of the target value PV is an important parameter that affects the number of rotations of the rotary blade 2, according to such an embodiment, it is possible to eliminate the need for the user to input detailed numerical values each time, thus improve usability.

Preferably, when the target value PV is set to be equal to or higher than a predetermined value, the adjusting unit 734 may adjust the target value PV based on the state or the behavior. Although the criteria of the predetermined value to be a threshold is not limited, it is particularly preferable that the predetermined value corresponding to the target value PV is determined based on the drive output DO in which noise perceived by the user exceeds the threshold. By setting a predetermined value of the target value PV as to whether or not to perform the adjustment of the target value PV, it is possible to implement a product in consideration of reduction in the burden on the user, such as noise in human engineering.

Figure 5:
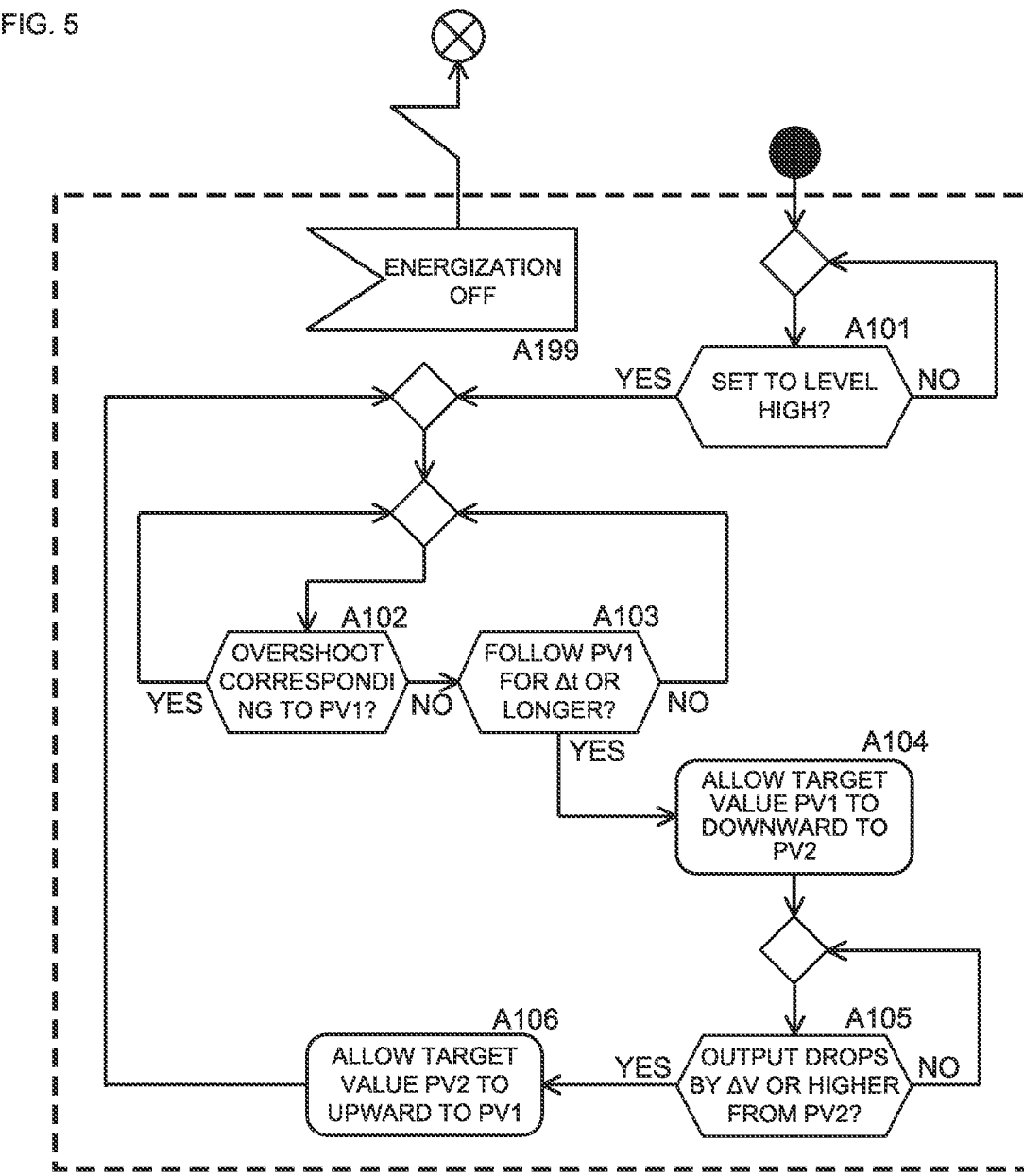
FIG. 5 is an activity diagram showing an example of a control method.

FIG. 5 is an activity diagram showing an example of the control method. In the activity diagram, it is assumed that the moment when the trigger lever 43 is pressed is regarded as the start after the user turns on the power switch 45 and releases the lockout lever 44.

Further, it is assumed that the levels that can be set by the user are three types: Low, Middle, and High. When result of determination in the activity A101 is set to the level High, the processing proceeds to the activities A102 to A106, which are loop processing. When the level is set to level High, the target value PV is set to a first target value PV1. When the number of rotations of the rotary blade 2 is 3000 to 10000 rpm as described above, the number of rotations of the target value PV corresponding to the level Low may be 3500 rpm, the number of rotations of the target value PV corresponding to the level Middle may be 6000 rpm, and the number of rotations of the target value PV corresponding to the level High may be 10000 rpm or the like.

Figure 6:
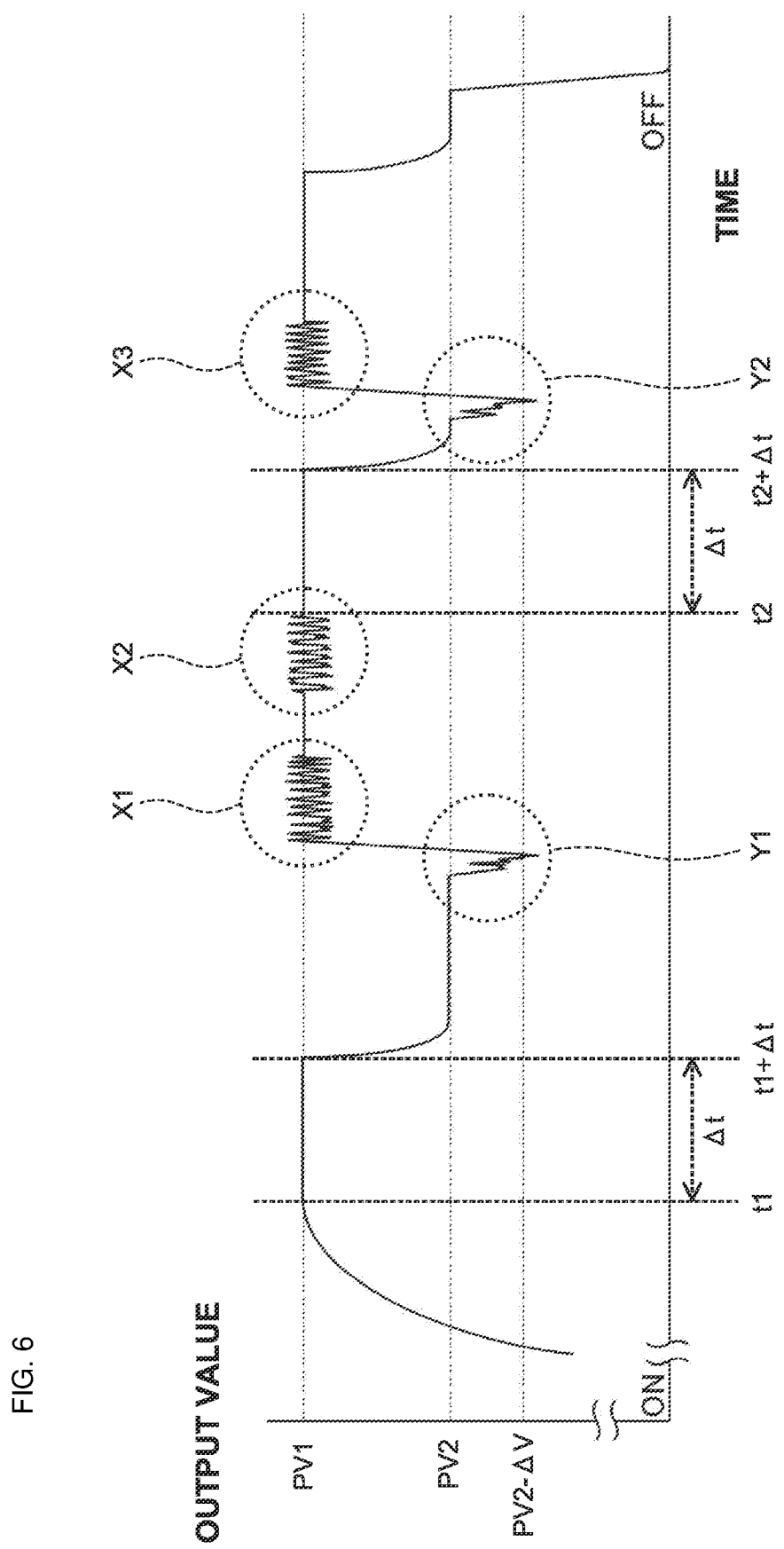
FIG. 6 is a graph showing an example of a temporal change of a drive output DO in a case where a level High is set.

FIG. 6 is a graph showing an example of a temporal change of the drive output DO when the level is set to High. In particular, as shown in FIG. 6, when a state is detected for a predetermined time $\Delta t$ or longer in which the drive output DO follows the first target value PV1 of the target value PV, the adjusting unit 734 may allow the target value PV to downward to be set as a second target value PV2, and when a behavior is detected that the drive output DO drops, from the state in which the drive output DO follows the second target value PV2 of the target value PV, by a predetermined value $\Delta V$ or higher compared to the second target value PV2, the adjusting unit 734 may allow the target value PV to upward to be set as the first target value PV1. Hereinafter, this flow will be described in detail.

In the activities A102 to A106 which are loop processing, the monitoring step by the monitoring unit 733 is continuously executed. Of course, when the user releases the pressing of the trigger lever 43 or turns off the power switch 45, the energization to the motor 64 is cut off, and the loop processing can be terminated (activity A199).

In the activity A102, the monitoring unit 733 monitors whether or not the drive output DO overshoots corresponding to the first target value PV1. Here, when a state is detected in which the drive output DO overshoots corresponding to the first target value PV1 of the target value PV, the driving unit 732 maintains the target value PV.

For example, FIG. 6 corresponds to a state in which X1, X2, X3, or the like overshoot. Since the overshooting state may be determined as a state in which fluctuation in rotation is occurring, i.e., the user is applying the rotary blade 2 to an object such as a weed, the target value PV is maintained at the first target value PV1 in order to maintain a high drive output DO suitable for mowing.

On the other hand, when no overshoot is detected, in the activity A103, the monitoring unit 733 monitors whether or not the drive output DO is stably following the first target value PV1. A state in which the drive output DO stably follows the target value PV may be determined as a state in which the rotary blade 2 is idled without hitting the object. In addition, when the state is detected for the predetermined time $\Delta t$ or longer in which the drive output DO follows the first target value PV1 of the target value PV, the adjusting unit 734 allows the target value PV to downward to be set as the second target value PV2 (activity A104).

For example, FIG. 6 shows an aspect in which the drive output DO follows the first target value PV1 for $\Delta t$ [second] from time t1 to t1+$\Delta t$ or time t2 to t2+$\Delta t$. As a result of detection thereof by the monitoring unit 733, the target value PV is lowered from the original first target value PV1 to the second target value PV2 by the adjusting unit 734. It should be noted that the target value PV corresponding to the level High is only lowered from the first target value PV1 to the second target value PV2, and the level that can be set by the user is not lowered.

The value of $\Delta t$ is, for instance, 0.5 to 10 [second], preferably 1 to 3 [second], specifically for example, 0.5, 1, 1.5, 2, 2.5, 3, 3.5, 4, 4.5, 5, 5.5, 6, 6.5, 7, 7.5, 8, 8.5, 9, 9.5, 10 [second], or may be within a range between any two of the numerical values exemplified here.

The ratio of the second target value PV2 to the first target value PV1 is, for example, 80 to 96%, specifically for example, 80, 80.5, 81, 81.5, 82, 82.5, 83, 83.5, 84, 84.5, 85, 85.5, 86, 86.5, 87, 87.5, 88, 88.5, 89, 89.5, 90, 90.5, 91, 91.5, 92, 92.5, 93, 93.5, 94, 94.5, 95, 95.5, 96%, or may be within a range between any two of the numerical values exemplified here.

In this way, since the aspect in which the drive output DO follows the target value PV is different between the case of idling and the case where mowing is performed, these can be distinguished from each other. That is, in a case where the overshoot occurs with a certain vibration or more, it is only necessary to maintain the target value PV at the first target value PV1 on the assumption that mowing is being performed. In addition, by lowering the target value PV from the first target value PV1 to the second target value PV2 in the idling state in which no mechanical action is added to the object, it is possible to prevent generation of noise caused by the rotary drive of the rotary blade 2, and to reduce the burden on the user. In addition, it is possible to reduce power consumption in a state where the mechanical action is not added to the object. In other words, it is possible to reduce the burden of noise on the user and improve workability at the same time.

Subsequently, in a state where the target value PV is lowered to the second target value PV2, in the activity A105, the monitoring unit 733 monitors whether or not the drive output DO drops by a predetermined value $\Delta V$ or higher from the second target value PV2. Here, when a behavior is detected that the drive output DO drops, from a state in which the drive output DO follows the second target value PV2 of the target value PV, by a predetermined value $\Delta V$ or higher compared to the second target value PV2, the adjusting unit 734 allows the target value PV to upward and to be set as the first target value PV1 (activity A106).

For example, FIG. 6 corresponds to a state in which Y1, Y2, or the like overshoot. In this way, when the drive output DO further drop by a predetermined value $\Delta V$ or higher from the state in which the drive output DO has dropped to the second target value PV2, it is determined that the rotary blade 2 is hitting the object, and the target value PV is returned to the first target value PV1, thereby a high function of mowing can be realized when the user is working.

The ratio of $\Delta V$ to the second target value PV2 is, for example, 0.5 to 5%, specifically, for instance, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5%, or may be within a range between any two of the numerical values exemplified here.

By the way, when the user sets the level High, although the target value PV transitions between the first target value PV1 and the second target value PV2, even the second target value PV2, which is a relatively low target value PV, is preferably higher than the target value PV corresponding to the level Middle. In other words, the adjusting unit 734 may adjust the target value PV within a range equal to or lower than the value corresponding to the set level and equal to or higher than the value corresponding to one level below the set level.

If the value for adjusting the target value PV is way too large, the control may become unstable, and in some cases, the power consumption may become even larger. According to such an aspect, since the target value PV is adjusted within a limited range, destabilization of control due to the adjustment is suppressed.

According to such an aspect, it is possible to reduce the burden on the user and increase energy efficiency when using a driving apparatus such as the brush cutter 1.

4. Others

The following aspects may be adopted related to the driving apparatus exemplified by the brush cutter 1.

(1) In the above embodiment, although the configuration of the brush cutter 1 has been described, a program allowing a computer to execute each step of the controller 73 in the brush cutter 1 may be provided.

Figure 7:
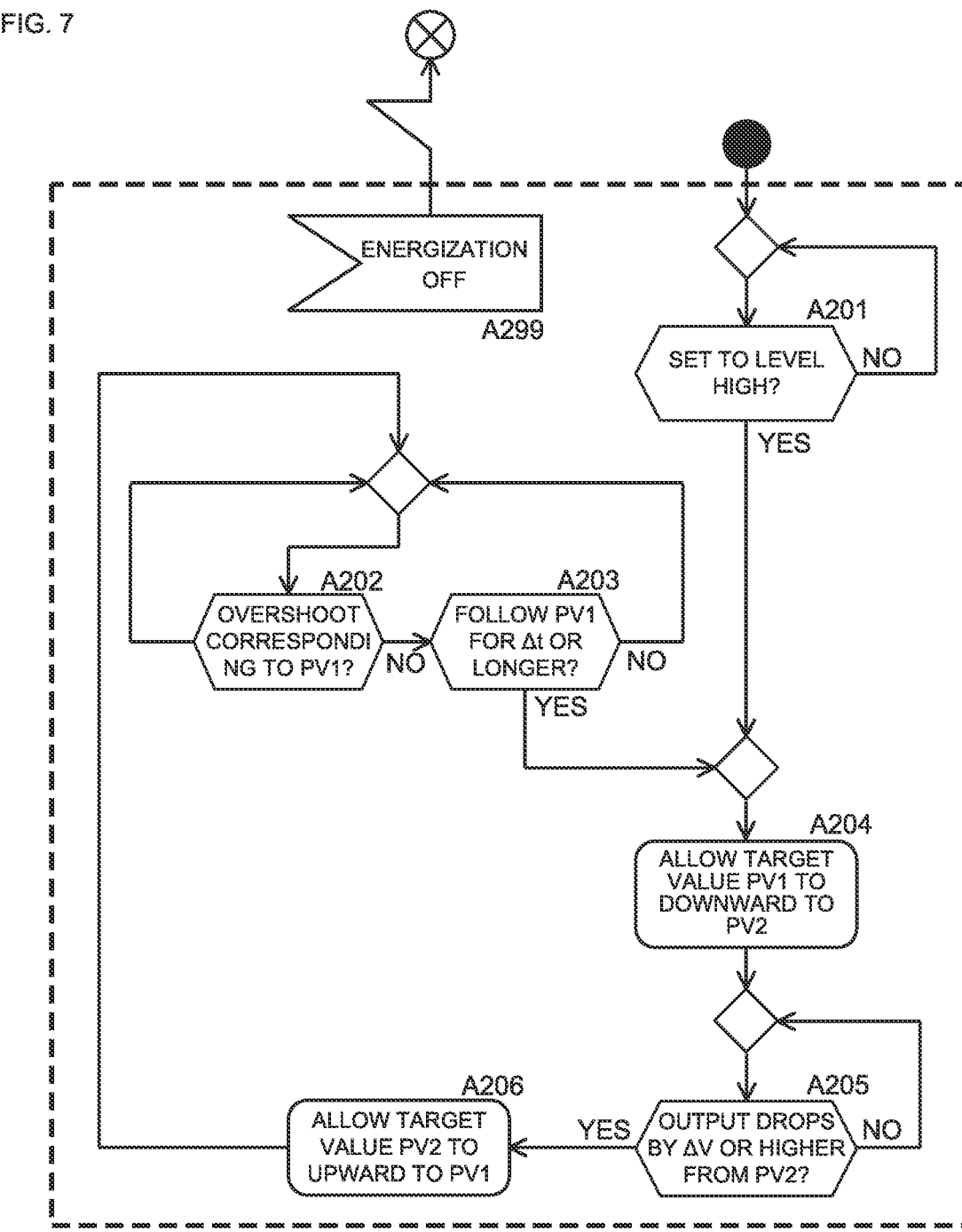
FIG. 7 is an activity diagram showing another example of the control method.

(2) Instead of the loop processing shown in FIG. 5, loop processing shown in FIG. 7 may be employed. FIG. 7 is an activity diagram showing another example of the control method. In the example shown in FIG. 7, although the loop processing per se is the same, it should be noted that when the level is set to level High, the target value PV is set to the second target value PV2, which is lower than the first target value PV1, from the beginning. In other words, the processing following activity A201 (equivalent to activity A101 in FIG. 5) is activity A204 (equivalent to activity A104 in FIG. 5). With such an aspect, it is possible to reduce the burden on the user and increase energy efficiency.

(3) In a state where the target value PV is the second target value PV2, if the drive output DO stably follow the second target value PV2 for a predetermined time or longer, the power may be automatically de-energized.

Furthermore, the present invention may be provided in each of the following aspects.

The driving apparatus wherein the controller is configured to execute the program so as to: in the adjusting step, adjust the target value based on the state or the behavior when the target value is set to a predetermined value or higher.

The driving apparatus wherein the predetermined value corresponding to the target value is determined based on a drive output in which noise perceived by the user exceeds a threshold value.

The driving apparatus wherein the target value is configured to be set by the user by selecting one of a plurality of levels.

The driving apparatus wherein the controller is configured to execute the program so as to: in the adjusting step, adjust the target value within a range equal to or lower than a value corresponding to a set level and equal to or higher than a value corresponding to one level below the set level.

The driving apparatus wherein the controller is configured to execute the program so as to: in the adjusting step, allow the target value to downward to be set as a second target value when a state is detected for a predetermined time or longer in which the drive output follows a first target value of the target value.

The driving apparatus wherein the controller is configured to execute the program so as to: in the adjusting step, allow the target value to upward to be set as the first target value when a behavior is detected that the drive output drops, from the state in which the drive output follows a second target value of the target value, by a predetermined value or higher compared to the second target value.

The driving apparatus wherein the controller is configured to execute the program so as to: in the adjusting step, allow the target value to downward to be set as a second target value when a state is detected for a predetermined time or longer, in which the drive output follows a first target value of the target value, and the target value to upward and return to the first target value when a behavior is detected that the drive output drops, from a state in which the drive output follows a second target value of the target value, by a predetermined value or higher compared to the second target value.

The driving apparatus wherein the controller is configured to execute the program so as to: in the adjusting step, maintain the target value when a state is detected in which the drive output overshoots corresponding to a first target value of the target value.

The driving apparatus further comprising: an encoder configured to output a drive output of the action unit as a physical signal, wherein the controller is configured to execute the program so as to: in the monitoring step, detect each state or behavior of the drive output by monitoring a deviation between the signal output by the encoder and a physical quantity corresponding to the target value.

The driving apparatus wherein the action unit is configured to rotary drive, and the target value and the drive output are number of rotations of the action unit.

The driving apparatus, the driving apparatus is a brush cutter or a chain saw.

A control method of the handheld driving apparatus for mowing or cutting an object, comprising: each step of the controller in the driving apparatus.

A non-transitory computer readable media storing a program, wherein: the program allows a computer to execute each step of the controller in the driving apparatus.

Of course, the above embodiments are not limited thereto.

Finally, various embodiments of the present invention have been described, but these are presented as examples and are not intended to limit the scope of the invention. The novel embodiment can be implemented in various other forms, and various omissions, replacements, and changes can be made without departing from the abstract of the invention. The embodiment and its modifications are included in the scope and abstract of the invention and are included in the scope of the invention described in the claims and the equivalent scope thereof.

What is claimed is:

1. A handheld driving apparatus for mowing or cutting an object, the handheld driving apparatus comprising:
   a container extending from a rear side where a user is located toward a front side where the object is located;
   an action unit, the action unit being:
     provided on the front side of the container; and
     configured to drive in such a manner that a mechanical action for mowing or cutting the object is configured to be applied to the object; and
   a controller configured to execute a program so as to:
     in a driving step, drive the action unit by controlling a drive output of the action unit to a first target value;
     in a monitoring step, monitor a state or a behavior of the drive output; and
     in an adjusting step, adjust the first target value to a second target value when the controller monitors that the drive output is maintained as the first target value for a predetermined period of time or longer during the monitoring as the state or the behavior of the drive output, wherein the first target value is larger than the second target value.

2. The handheld driving apparatus according to claim 1, wherein:
the controller is further configured to:
in the adjusting step, adjust the first target value when the first target value is set to a predetermined target value or more, and
the predetermined target value is determined based on the drive output in which noise perceived by the user exceeds a threshold value.

3. A non-transitory computer readable media storing a program, wherein:
the program is configured to cause a computer to execute each step of the driving, monitoring, and adjusting steps of the controller in the handheld driving apparatus according to claim 1.

4. The handheld driving apparatus according to claim 1, wherein:
each of the first and second target values corresponds to one level of a plurality of levels, and one level of the plurality of levels is configured to be set by the user, and
the second target value is in a range of a set level of the plurality of levels to another level of the plurality of levels, and the another level is one level below the set level.

5. The handheld driving apparatus according to claim 1, wherein:
in the adjusting step, the controller is further configured to adjust the second target value to the first target value when the controller monitors that the drive output decreases from the second target value by a predetermined value or more during the monitoring as the state or the behavior of the drive output.

6. A control method of the handheld driving apparatus for mowing or cutting an object, comprising:
each step of the driving, monitoring, and adjusting steps of the controller in the handheld driving apparatus according to claim 1.

7. A handheld driving apparatus for mowing or cutting an object, the handheld driving apparatus comprising:
a container extending from a rear side where a user is located toward a front side where the object is located;
an action unit, the action unit being:
provided on the front side of the container; and
configured to drive in such a manner that a mechanical action for mowing or cutting the object is configured to be applied to the object; and
a controller configured to execute a program so as to:
in a driving step, drive the action unit by controlling a drive output of the action unit to a first target value;
in a monitoring step, monitor a state or a behavior of the drive output with respect to the first target value during the control in the driving step; and
in an adjusting step:
adjust the first target value to a second target value when the controller monitors that the drive output is maintained as the first target value for a predetermined period of time or longer during the monitoring as the state or the behavior of the drive output, the first target value being larger than the second target value; and
adjust the second target value to the first target value when the controller monitors that the drive output decreases from the second target value by a predetermined value or more during the monitoring as the state or the behavior of the drive output.

8. The handheld driving apparatus according to claim 7, wherein:
the controller is further configured to:
in the adjusting step, adjust the first target value when the first target value is set to a predetermined target value or more, and
the predetermined target value is determined based on the drive output in which noise perceived by the user exceeds a threshold value.

9. The handheld driving apparatus according to claim 7, wherein:
each of the first and second target values corresponds to one level of a plurality of levels, and one level of the plurality of levels is configured to be set by the user, and
the second target value is in a range of a set level of the plurality of levels to another level of the plurality of levels, and the another level is one level below the set level.

10. A control method of the handheld driving apparatus for mowing or cutting an object, comprising:
each step of the driving, monitoring, and adjusting steps of the controller in the handheld driving apparatus according to claim 7.

11. A non-transitory computer readable media storing a program, wherein:
the program is configured to cause a computer to execute each step of the driving, monitoring, and adjusting steps of the controller in the handheld driving apparatus according to claim 7.

12. A handheld driving apparatus for mowing or cutting an object, the handheld driving apparatus comprising:
a container extending from a rear side where a user is located toward a front side where the object is located;
an action unit, the action unit being:
provided on the front side of the container; and
configured to drive in such a manner that a mechanical action for mowing or cutting the object is configured to be applied to the object; and
a controller configured to execute a program so as to:
in a driving step, drive the action unit by controlling a drive output of the action unit to a first target value;
in a monitoring step, monitor a state or a behavior of the drive output; and
in an adjusting step, adjust the first target value based on the state or the behavior during the monitoring,
wherein the controller is further configured to maintain the drive output as the first target value when the controller detects an overshoot state in which the drive output fluctuates above and below the first target value with an amplitude equal to or greater than a certain level during a certain period of time.

13. The handheld driving apparatus according to claim 12, wherein:
the controller is further configured to:
in the adjusting step, adjust the first target value when the first target value is set to a predetermined target value or more, and
the predetermined target value is determined based on the drive output in which noise perceived by the user exceeds a threshold value.

14. The handheld driving apparatus according to claim 12, wherein:
   the first target value corresponds to one level of a plurality of levels, and one level of the plurality of levels is configured to be set by the user.

15. A control method of the handheld driving apparatus for mowing or cutting an object, comprising:
   each step of the driving, monitoring, and adjusting steps of the controller in the handheld driving apparatus according to claim 12.

16. A non-transitory computer readable media storing a program, wherein:
   the program is configured to cause a computer to execute each step of the driving, monitoring, and adjusting steps of the controller in the handheld driving apparatus according to claim 12.

\* \* \* \* \*